(12) United States Patent
Tokmakov et al.

(10) Patent No.: US 11,625,905 B2
(45) Date of Patent: Apr. 11, 2023

(54) SYSTEM AND METHOD FOR TRACKING OCCLUDED OBJECTS

(71) Applicant: TOYOTA RESEARCH INSTITUTE, INC., Los Altos, CA (US)

(72) Inventors: Pavel V. Tokmakov, San Francisco, CA (US); Rares A. Ambrus, San Francisco, CA (US); Wolfram Burgard, Mountain View, CA (US); Adrien David Gaidon, Mountain View, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 219 days.

(21) Appl. No.: 17/203,583

(22) Filed: Mar. 16, 2021

(65) Prior Publication Data

US 2022/0300748 A1 Sep. 22, 2022

(51) Int. Cl.
*G06V 10/20* (2022.01)
*G06V 10/46* (2022.01)
*G06V 20/56* (2022.01)
*G06V 10/10* (2022.01)

(52) U.S. Cl.
CPC ......... *G06V 10/255* (2022.01); *G06V 10/469* (2022.01); *G06V 20/56* (2022.01); *G06V 10/16* (2022.01)

(58) Field of Classification Search
CPC .... G06V 10/255; G06V 10/469; G06V 10/16; G06V 20/56
See application file for complete search history.

(56) References Cited

U.S. PATENT DOCUMENTS 6,674,877 B1 1/2004 Jojic et al.
7,394,916 B2 7/2008 Brodsky et al.
(Continued)

FOREIGN PATENT DOCUMENTS

WO WO-2014178273 A1 * 11/2014 ............. G05D 1/024

OTHER PUBLICATIONS

Translation of WO2014/178273 (Year: 2014).*
(Continued)

*Primary Examiner* — Carol Wang
(74) *Attorney, Agent, or Firm* — Seyfarth Shaw LLP

(57) ABSTRACT

A method for tracking an object performed by an object tracking system includes encoding locations of visible objects in an environment captured in a current frame of a sequence of frames. The method also includes generating a representation of a current state of the environment based on an aggregation of the encoded locations and an encoded location of each object visible in one or more frames of the sequence of frames occurring prior to the current frame. The method further includes predicting a location of an object occluded in the current frame based on a comparison of object centers decoded from the representation of the current state to object centers saved from each prior representation associated with a different respective frame of the sequence of frames occurring prior to the current frame. The method still further includes adjusting a behavior of an autonomous agent in response to identifying the location of the occluded object.

20 Claims, 5 Drawing Sheets

(56) References Cited

U.S. PATENT DOCUMENTS

2014/0342834 A1* 11/2014 Tappeiner ............... A63F 13/00
 463/42
2021/0056712 A1* 2/2021 Daudelin ............... G06V 20/56

OTHER PUBLICATIONS

Alahi, et al., "Social LSTM: Human trajectory prediction in crowded spaces", In CVPR, 2016.
Ballas, et al., "Delving deeper into convolutional networks for learning video representations", In ICLR, 2016.
Berclaz, et al., "Robust people tracking with global trajectory optimization", In CVPR, 2006.
Berclaz, et al., "Multiple object tracking using k-shortest paths optimization", IEEE Transactions on Pattern Analysis and Machine Intelligence, 33(9):1806-1819, 2011.
Bergmann, et al., "Tracking without bells and whistles", in ICCV, 2019.
Bernardin, et al., "Evaluating multiple object tracking performance: the clear mot metrics", EURASIP Journal on Image and Video Processing, 2008:1-10, 2008.
Bewley, et al., "Simple online and realtime tracking", In ICIP, 2016.
Braso, et al., "Learning a neural solver for multiple object tracking", In CVPR, 2020.
Breitenstein, et al., "Robust tracking-bydetection using a detector confidence particle filter", In ICCV, 2009.
Caesar, et al., "nuscenes: A multimodal dataset for autonomous driving", In CVPR, 2020.
Chen, et al., "Real-time 'actor-critic' tracking", In ECCV,2018.
Cho, et al., "Learning phrase representations using rnn encoder-decoder for statistical machine translation", In EMNLP, 2014.
Choi, et al., "Multiple target tracking in world coordinate with single, minimally calibrated camera", In ECCV, 2010.
Dave, et al., "Tao: A large-scale benchmark for tracking any object", In ECCV, 2020.
Dosovitskiy, et al., "Flownet: Learning optical flow with convolutional networks", In CVPR, 2015.
Feichtenhofer, et al., "Detect to track and track to detect", In ICCV, 2017.
Greiger, et al., "Are we ready for autonomous driving? The KITTI vision benchmark suite", In CVPR, 2012.
Ilg, et al., "Flownet 2.0: Evolution of optical flow estimation with deep networks", In CVPR, 2017.
Jiang, et al., "A linear programming approach for multiple object tracking", In CVPR, 2007.
Kang, et al., "Object detection in videos with tubelet proposal networks", In CVPR, 2017.
Mei, et al., "Instance adaptive self-training for unsupervised domain adaptation", In ECCV, 2020.
Leal-Taixe, et al., "Learning an image-based motion context for multiple people tracking", In CVPR, 2014.
Lee, et al., "SPI-GAN: privileged adversarial learning from simulation", In Int. Conf. Learn. Represent.
Lin, et al., "Focal loss for dense object detection", In Proceedings of the IEEE international conference on computer vision, pp. 2980-2988, 2017.
Luiten, et al., Hota: A higher order metric for evaluating multi-object tracking. International Journal of Computer Vision, pp. 1-31, 2020.
Milan, et al., "MOT16: A benchmark for multi-object tracking", arXiv preprint arXiv:1603.00831, 2016.
Milan, et al., "Online multi-target tracking using recurrent neural networks", In AAAI, 2017.
Pirsiavash, et al., "Globally-optimal greedy algorithms for tracking a variable number of objects", In CVPR, 2011.
Ren, et al., "Collaborative deep reinforcement learning for multi-object tracking", In ECCV, 2018.
Ren, et al., "Faster R-CNN: Towards real-time object detection with region proposal networks", In NIPS, 2015.
Ristani, et al., "Features for multi-target multi-camera tracking and re-identification", In CVPR, 2018.
Russakovdky, et al., "Imagenet large scale visual recognition challenge", International journal of computer vision, 115(3):211-252, 2015.
Shao, et al., "Crowdhuman: A benchmark for detecting human in a crowd", arXiv preprint arXiv:1805.00123, 2018.
Tang, et al., "Multiple people tracking by lifted multicut and person re-identification", In CVPR, 2017.
Tokmakov, et al., "Learning motion patterns in videos", In CVPR, 2017.
Tokmakov, et al., "Learning video object segmentation with visual memory", In ICW, 2017.
Vu, et al., "Dada: Depth-aware domain adaptation in semantic segmentation", In ICCV, 2019.
Werbos, Peter "Backpropagation through time: what it does and how to do it", Proceedings of the IEEE, 78 (10):1550-1560, 1990.
Wojke, et al., "Simple online and realtime tracking with a deep association metric", 2017 IEEE International Conference on Image Processing (ICIP), Beijing, China, 2017, pp. 3645-3649.
Xiao, et al., "Video object detection with an aligned spatial-temporal memory", Proceedings of the European Conference on Computer Vision (ECCV), 2018, pp. 485-501.
Xu, et al., "Spatialtemporal relation networks for multi-object tracking", Proceedings of the IEEE/CVF International Conference on Computer Vision (ICCV), 2019, pp. 3988-3998.
Yang, et al., "Video instance segmentation", Proceedings of the IEEE/CVF International Conference on Computer Vision (ICCV), 2019, pp. 5188-5197.
Zhang, et al., "Global data association for multi-object tracking using network flows", 2008 IEEE Conference on Computer Vision and Pattern Recognition (2008): 1-8.
Zhou, et al., "Tracking objects as points", 2020 European Conference on Computer Vision, 474-490.
Zhou, et al., "Objects as points", arXiv preprint arXiv:1904.07850, 2019.
Dequaire, et al., "Deep tracking on the move: Learning to track the world from a moving vehicle using recurrent neural networks", arXiv preprint arXiv:1609.09365, 2016.
Ajoy Mondal, "Occluded Object Tracking using Object-Background Prototypes and Particle Filter", Appl Intell., 2021.
Ren, et al., "Deformable faster r-cnn with aggregating multi-layer features for partially occluded object detection in optical remote sensing images" Remote Sensing 10, No. 9 (2018): 1470.
Zhao, et al., "Multi-Object Tracking with Correlation Filter for Autonomous Vehicle", Sensors (Basel). Jul. 2018; 18(7): 2004.

\* cited by examiner

SYSTEM AND METHOD FOR TRACKING OCCLUDED OBJECTS

FIELD

Certain aspects of the present disclosure generally relate to tracking occluded objects.

BACKGROUND

Autonomous agents (e.g., vehicles, robots, etc.) may obtain information regarding a surrounding environment by analyzing areas of interest in images of the surrounding environment obtained from a machine vision system. In operation, autonomous agents may rely on a trained neural network, such as a convolutional neural network (CNN), to identify objects within areas of interest in an image of a surrounding scene of the autonomous agent. For example, a CNN may be trained to identify and track objects captured by one or more sensors, such as light detection and ranging (LIDAR) sensors, sonar sensors, red-green-blue (RGB) cameras, RGB-depth (RGB-D) cameras, and the like. The sensors may be coupled to, or in communication with, a device, such as an autonomous vehicle. Object detection applications for autonomous vehicles may analyze sensor image data for detecting objects in the surrounding scene from the autonomous agent.

In most cases, multiple objects may be detected in an environment. In these situations, an object detection system may be specified to detect all objects in an environment and maintain each objects identity over a period of time. In some examples, each object may be individually localized, and the individual localizations may be combined into tracks based on spatio-temporal overlap and appearance similarity. In such examples, the tracking may be fragmented if a tracked object is occluded for one or more frames. It may be desirable to improve tracking to account for object occlusions.

SUMMARY

In one aspect of the present disclosure, a method for object tracking includes encoding locations of visible objects in an environment captured in a current frame of a sequence of frames. The method further includes generating a representation of a current state of the environment based on an aggregation of the encoded locations and an encoded location of each object visible in one or more frames of the sequence of frames occurring prior to the current frame. The method still further includes predicting a location of an object occluded in the current frame based on a comparison of object centers decoded from the representation of the current state to object centers saved from each prior representation associated with a different respective frame of the sequence of frames occurring prior to the current frame. The method also includes adjusting a behavior of an autonomous agent in response to identifying the location of the occluded object.

Another aspect of the present disclosure is directed to an apparatus for object tracking, the apparatus includes means for encoding locations of visible objects in an environment captured in a current frame of a sequence of frames. The apparatus further includes means for generating a representation of a current state of the environment based on an aggregation of the encoded locations and an encoded location of each object visible in one or more frames of the sequence of frames occurring prior to the current frame. The apparatus still further includes means for predicting a location of an object occluded in the current frame based on a comparison of object centers decoded from the representation of the current state to object centers saved from each prior representation associated with a different respective frame of the sequence of frames occurring prior to the current frame. The apparatus also includes means for adjusting a behavior of an autonomous agent in response to identifying the location of the occluded object.

In another aspect of the present disclosure, a non-transitory computer-readable medium with non-transitory program code for object tracking is recorded thereon is disclosed. The program code is executed by a processor and includes program code to encode locations of visible objects in an environment captured in a current frame of a sequence of frames. The program code further includes program code to generate a representation of a current state of the environment based on an aggregation of the encoded locations and an encoded location of each object visible in one or more frames of the sequence of frames occurring prior to the current frame. The program code still further includes program code to predict a location of an object occluded in the current frame based on a comparison of object centers decoded from the representation of the current state to object centers saved from each prior representation associated with a different respective frame of the sequence of frames occurring prior to the current frame. The program code also includes program code to adjust a behavior of an autonomous agent in response to identifying the location of the occluded object.

Another aspect of the present disclosure is directed to an apparatus having a memory, one or more processors coupled to the memory, and instructions stored in the memory and operable, when executed by the processor, to cause the apparatus to encode locations of visible objects in an environment captured in a current frame of a sequence of frames. The instructions further cause the apparatus to generate a representation of a current state of the environment based on an aggregation of the encoded locations and an encoded location of each object visible in one or more frames of the sequence of frames occurring prior to the current frame. The instructions also cause the apparatus to predict a location of an object occluded in the current frame based on a comparison of object centers decoded from the representation of the current state to object centers saved from each prior representation associated with a different respective frame of the sequence of frames occurring prior to the current frame. The instructions further cause the apparatus to adjust a behavior of an autonomous agent in response to identifying the location of the occluded object.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

An agent, such as an autonomous agent, may detect and track multiple objects in an environment. Object detection and tracking may be used to perform various tasks, such as scene understanding, motion planning, and/or obstacle avoidance. That is, the agent may autonomously navigate through an environment based on the tracked objects.

Conventional systems may individually localize each detected object, and the detected objects may be combined into tracks based on spatio-temporal overlap and appearance similarity. In such systems, the tracking may be fragmented if a tracked object is occluded for one or more frames. It may be desirable to improve tracking to account for object occlusions.

That is, an ability to predict object locations behind occlusions may reduce collisions and improve vehicle navigation, such as autonomous or semi-autonomous navigation. As an example, a person may run behind a parked car and may no longer be visible to a driver of a vehicle. Still, in such an example, the driver is still aware of the potential danger and slows down when passing by the parked car. Conventional autonomous vehicles lack this type of ability. Aspects of the present disclosure improve object tracking by training an object tracking model on real and synthetic data to track objects that are occluded in one or more frames of a sequence of frames. In the current disclosure, an autonomous vehicle may refer to an autonomous vehicle and/or a semi-autonomous vehicle.

Figure 1:
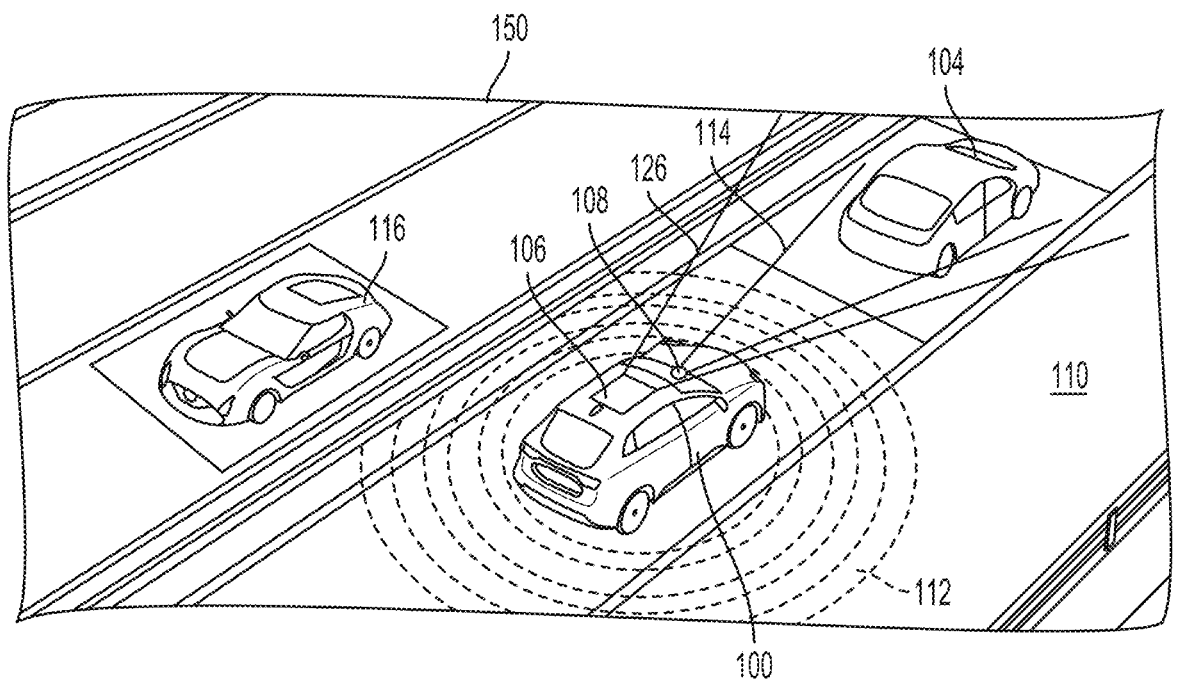
FIG. 1 is a diagram illustrating an example of a vehicle in an environment according to aspects of the present disclosure.

FIG. 1 illustrates an example of an ego vehicle 100 (e.g., ego agent) in an environment 150 according to aspects of the present disclosure. As shown in FIG. 1, the ego vehicle 100 is traveling on a road 110. A first vehicle 104 (e.g., other agent) may be ahead of the ego vehicle 100, and a second vehicle 116 may be adjacent to the ego vehicle 100. In this example, the ego vehicle 100 may include a first sensor 108, such as a 2D RGB camera, and a second sensor 106. The second sensor 106 may be another RGB camera or another type of sensor, such as RADAR and/or ultrasound. Additionally, or alternatively, the ego vehicle 100 may include one or more additional sensors. For example, the additional sensors may be side facing and/or rear facing sensors.

In one configuration, the first sensor 108 captures a 2D image that includes objects in the first sensor's 108 field of view 114. The second sensor 106 may generate one or more output streams. The 2D image captured by the first sensor 108 includes a 2D image of the first vehicle 104, as the first vehicle 104 is in the first sensor's 108 field of view 114.

The information obtained from the sensors 106, 108 may be used to navigate the ego vehicle 100 along a route when the ego vehicle 100 is in an autonomous mode. The sensors 106, 108 may be powered from electricity provided from the vehicle's 100 battery (not shown). The battery may also power the vehicle's motor. The information obtained from the sensors 106, 108 may be used for keypoint matching.

Figure 2:
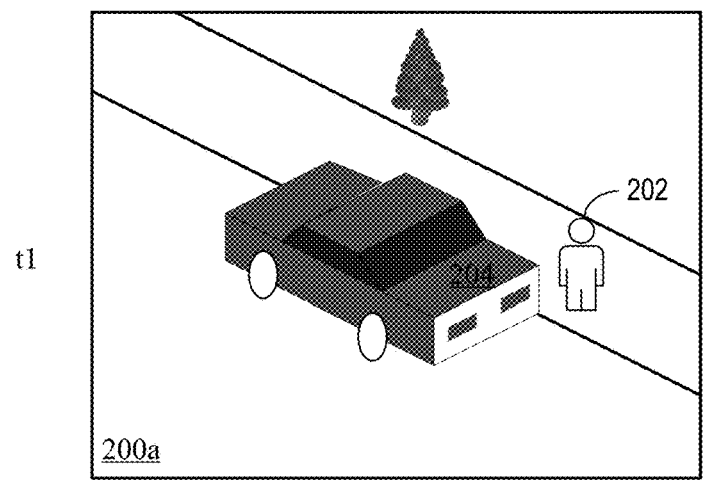
FIG. 2 is a diagram illustrating an example of a sequence of frames, in accordance with aspects of the present disclosure.
Figure 2:
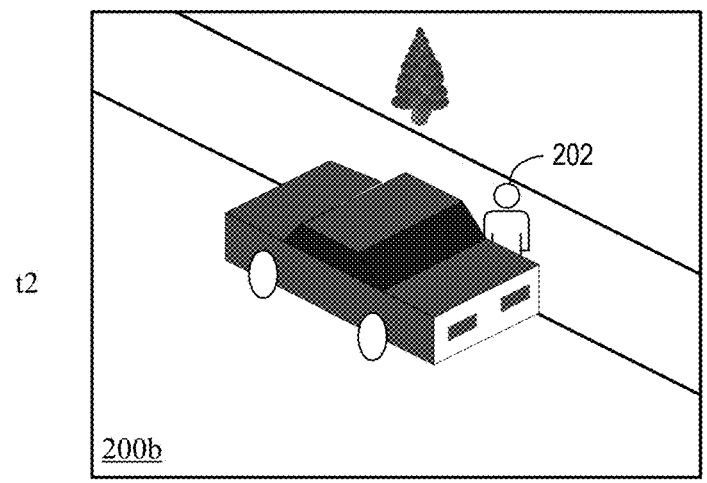
Figure 2:
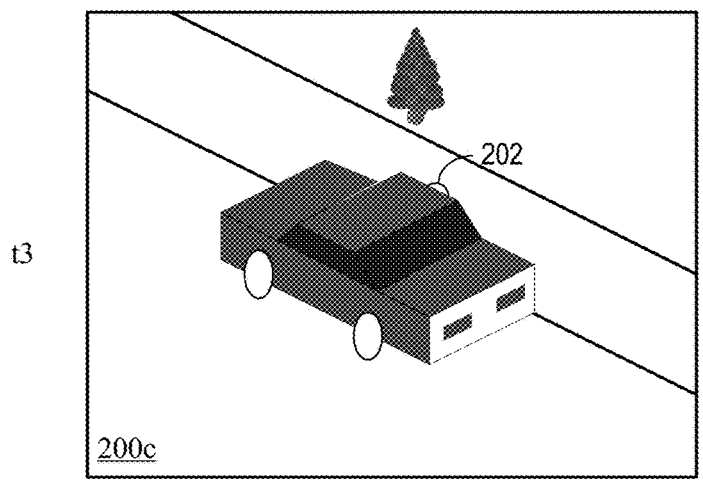

FIG. 2 is a diagram illustrating an example of a person 202 in a sequence of frames. In the example of FIG. 2, at time t1, at a first frame 200a of the sequence of frames, a person 202 is visible to the right of a car 204. At time t2, the person 202 may still be visible in a second frame 200b of the sequence of frames. However, at time t3, the person 202 is no longer visible in a third frame 200c of the sequence of frames because the person 202 has walked behind the car 204. A human observer may determine that the person 202 is still present in the environment and has not disappeared. Still, a conventional object tracker may fail to determine that the person 202 is still present in the environment when the person 202 is occluded by the car 204. Object trackers are not limited to tracking people, such as the person 202, as other types of objects, such as vehicles, may be tracked.

In the example of FIG. 2, the frames 200a, 200b, 200c may be captured via one or more sensors of an agent, such as the first sensor 108 and the second sensor 106 of the ego vehicle 100 as described with reference to FIG. 1. In other examples, the frames 200a, 200b, 200c may be synthetically generated and provided to an object tracking model (e.g., object tracking neural network). In the example of FIG. 2, the frames 200a, 200b, 200c may be sequential in time.

In some aspects, a trained object tracking model may estimate a location of an occluded object at each moment in time. In the example of FIG. 2, the trained object tracking model may estimate a location of the person 202 at each moment in time after the person 202 is occluded by the car 204. The trained object tracking model may also determine when the occluded object, such as the person 202, may reappear. The ability to estimate a location of an occluded object at each moment in time and determine when the occluded object may reappear may be referred to as object permanence.

Conventional multi-object tracking systems operate in a tracking-by-detection paradigm. That is, the conventional multi-object tracking systems use an existing object detector to localize objects of interest in each frame of a sequence of frames, and then link the localized objects into tracks, in an online or offline manner. For ease of explanation, in the current disclosure, a multi-object tracking system or model may be referred to as an object tracking system or model. In some cases, conventional object tracking systems link a detected object to an existing trajectory based on bounding box overlap, learned appearance embedding, human pose, or graph-convolutional based trajectory representations. The conventional object tracking systems may be limited due to their frame-based nature. Such conventional object tracking systems resort to heuristic-based algorithms to handle occlusions.

Additionally, some conventional object tracking systems combine detection and tracking in a single model. These conventional object tracking systems receive pairs of frames as an input, and output object detections together with pairwise associations. These conventional object tracking systems may improve tracking robustness. Still, such conventional object tracking systems may only handle primitive forms of occlusions, such as occlusions that last one frame.

Aspects of the present disclosure are directed to an online setting, where an object tracking model associates an object detected in a current frame with one of the previously established trajectories for the detected object. In one configuration, an end-to-end trainable object tracking model is specified to localize objects behind occlusions. In some aspects, the object tracking model utilizes a center-tracking model to a sequence of frames as an input, and predicts object centers together with their displacement vectors. The displacement vectors may be used to link object detections into tracks.

Aspects of the present disclosure may operate on sequences of frames (e.g., videos) having an arbitrary length. In one configuration, each frame may be processed by a center-tracking model configured to extract features from the frame. The resulting features may be provided to a convolutional gated recurrent unit (ConvGRU) to aggregate a spatio-temporal representation of the scene. The ConvGRU is an example of an extension of a conventional gated recurrent unit (GRU). In such an example, the fully connected layer of the GRU is replaced by a convolutional layer, such that the ConvGRU has the time sequence modeling capability of the GRU. Additionally, similar to a convolutional neural network (CNN), the ConvGRU may describe local features.

The ConvGRU may generate a current state for a current frame t, which may be stored in a memory module. In some implementations, object centers and corresponding displacement vectors may be determined based on the current state of the frame t. In one configuration, the object tracking model may use a full context of a video from an initial frame (e.g., frame 1) to a current frame t $\{1, \ldots, t\}$, in contrast to conventional object tracking systems that are limited to a previous frame t−1 and a current frame t $\{t-1, t\}$. As such, the object tracking model of the current disclosure may be more robust in comparison to conventional object tracking systems. Additionally, the object tracking model of the current disclosure may learn to localize and associate objects that are not visible in the current frame.

As described, aspects of the present disclosure implement a center-tracking model. In one configuration, the center-tracking model generates a representation of each object (e.g., each object of interest) by a single point at a center of a bounding box of the object. This center point may be tracked through time. That is, the center-tracking model may localize object centers.

A conventional center-tracking model detects object centers based on two consecutive frames $\{I^{t-1}, I^t\}$, as well as a heatmap of prior tracked objects $H^{t-1}$, represented as center points $p \in \mathbb{R}^2$, where $\mathbb{R}^2$ is a 2-dimensional space of real numbers. In such conventional modes, the three input tensors (e.g., the two consecutive frames $\{I^{t-1}, I^t\}$ and the heatmap of prior tracked objects $H^{t-1}$) may be concatenated and passed through a backbone network f to produce a feature map $F^t = f(H^{t-1}, I^{t-1}, I^t)$. The feature map $F^t$ may be used to localize object centers in a current frame $\{\hat{p}_0^t, \hat{p}_1^t, \ldots\}$, regress object bounding box sizes $\{\hat{s}_0^t, \hat{s}_1^t \ldots\}$, and predict object displacement vectors with respect to a location of the object in a previous frame $\{\hat{d}_0^t, \hat{d}_1^t \ldots\}$. At test time (e.g., real-world deployment), displacement vectors may be used to project each center to the previous frame via $\hat{p}_i^t - \hat{d}_i^t$. The projected center may be greedily matched to a closest available center $\hat{p}_*^{t-1}$, thus recovering the track of the object. The detector of the conventional center-tracking model is trained to output an offset vector from an object center of a current frame t to its center in the previous frame t−1. That is, for each object of interest, the object may be associated with a track of a previous object based on greedy matching a distance between the predicted offset and the detected center point in the previous frame.

The outputs of the center-tracking model (e.g., centers p, bounding box dimensions s, and displacement vectors d) may be predicted and supervised on a pixel level. That is, the feature map $F^t$ may be passed through separate sub-networks $f_p, f_s, f_d$ to produce corresponding outputs $P_t \in [0,1]^{H \times W \times C}$, $S_t \in \mathbb{R}^{H \times W \times C}$, $D_t \in \mathbb{R}^{H \times W \times 2}$, where C represents a number of classes that may be detected by the object detector. The outputs generated by the sub-networks may be considered localizations, where each localization represents an object of a class that is centered in the localization ($P_t \in [0,1]^{H \times W \times C}$), a size of the object's bounding box ($S_t \in \mathbb{R}^{H \times W \times C}$), and a displacement of the center with respect to the previous frame ($D_t \in \mathbb{R}^{H \times W \times 2}$). The actual centers p may be recovered by extracting local peaks in each neighborhood, such as a 3×3 neighborhood, with a value in that location serving as confidence in a detection.

As described, conventional center-tracking models consider a pair of consecutive frames. Limiting the consideration to the pair of consecutive frames may limit to model to tracking objects that are visible in every frame of the video. Incorporating previous frame detections in the input may assist in tracking partial occlusions or full occlusions which are one frame long. Still, the conventional center-tracking models cannot track more complex scenarios, such as an object that is invisible in both frames t and t−1. Therefore, aspects of the present disclosure are directed to extending the center-track model to a global, video-level model.

Figure 3:
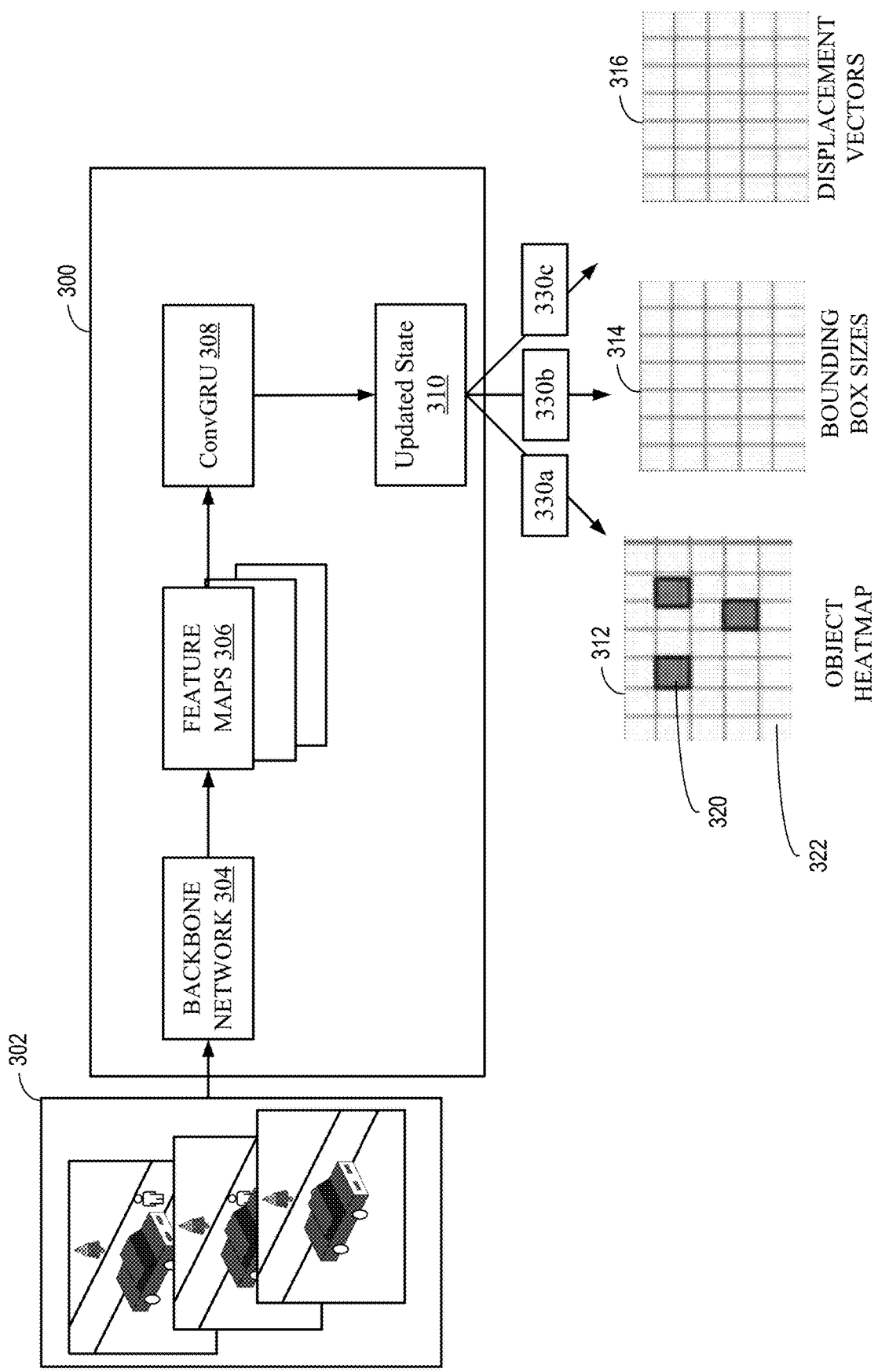
FIG. 3 is a block diagram illustrating an example of an object tracking model, in accordance with aspects of the present disclosure.

FIG. 3 is a diagram illustrating an example of an object tracking model 300, in accordance with aspects of the present disclosure. As shown in FIG. 3, the object tracking model 300 receives, as an input, a sequence of frames 302 $\{I^1, I^2, \ldots, I^n\}$, such as the sequence of frames 200a, 200b, 200c described with reference to FIG. 2. The sequence of frames 302 may be consecutively provided to backbone network f 304 to obtain feature maps 306 $\{F^1, F^2, \ldots, F^n\}$ for the sequence of frames. That is, each frame of the sequence of frames 302 is individually passed through the backbone network 304 in a consecutive manner to obtain a different feature map 306 for each respective frame of the sequence of frames 302. Each feature map $F^i$ encodes locations of visible objects in a corresponding frame $I^i$. The feature map may be an example of a feature map generated from a convolutional neural network. The backbone network 304 may be modeled based on the conventional center-tracking model described above. However, in contrast to the conventional center-tracking model, the backbone network 304 does not receive a heatmap $H^{t-1}$ of a previous frame. As such, a number of initial layers of the backbone network 304 may be different from a number of initial layers of the conventional center-tracking model.

Aspects of the present disclosure process sequences of feature maps and aggregate a representation of the scene, which encodes the locations of all the previously seen objects, even if they become fully occluded. In one configuration, the object tracking model 300 includes a convolutional gated recurrent unit (ConvGRU) 308, which may be a type of a recurrent memory network. The ConvGRU 308 may be an extension of a gated recurrent unit (GRU). That is, the ConvGRU 308 may replace a 1D state vector of the GRU with a 2D state feature map M In some examples, the 2D feature map represents spatial information (e.g., height and width). In contrast, the 1D state vector condenses all the spacial information into a single vector. For example, the 1D state vector may be an average of the values over all over all spatial locations). Additionally, the ConvGRU 308 may replace fully connected layers of the GRU, used to compute state updates, with 2D convolutions. As a result, the ConvGRU 308 may capture temporal and spatio-temporal patterns in the inputs. That is, the ConvGRU 308 aggregates information over the sequence of frames.

In the example of FIG. 3, at each time step t, a corresponding feature map $F^t$ may be passed to the ConvGRU 308 to determine an updated state 310 $M^t$=GRU($M^{t-1}$, $F^t$). In some implementations, for frame t in a sequence of frames (e.g., video sequence), the GRU function (GRU ( )) uses a two-stream representation, feature map $F^t$ and a previous state $M^{t-1}$, to compute the new state $M^t$. The dynamics of this computation are guided by an update gate $Z^t$, a forget gate $R^t$. The states and the gates are 3D tensors, and can characterize spatio-temporal patterns in the sequence of frames, effectively memorizing which objects move, and where they move to. These components are computed with convolutional operators and nonlinearities as follows:

$$Z^t = \sigma(F^t + W^{FZ} + M^{t-1} * W^{MZ} + B^Z) \quad (1)$$

$$R^t = \sigma(F^t + W^{FR} + M^{t-1} * W^{MR} + B^R), \quad (2)$$

$$\tilde{M}^t = \tan h)F^t + W^{F\tilde{M}} + R^t \odot M^{t-1} * W^{M\tilde{M}} + B^{\tilde{M}}), \quad (3)$$

$$M^t = (1-Z^t) \odot M^{t-1} + Z^t \odot \tilde{M}^t, \quad (4)$$

where $\odot$ denotes element-wise multiplication, * represents a convolutional operation, $\sigma$ is a sigmoid function, W is a learned transformation, and B is a bias term. The updated state 310 $M^t$ may be a weighted combination of the feature map $F^t$ and the previous state $M^{t-1}$. The updated gate $Z^t$ may determine an amount of memory that is incorporated into the updated state 310 $M^t$. In EQUATION 3, $\tilde{M}^t$ represents a candidate memory. The candidate memory $\tilde{M}^t$ may be ignored if the updated gate $Z^t$ is zero or a near-zero value. The reset gate $R^t$ controls an influence of a previous state $M^{t-1}$ on the candidate memory $\tilde{M}^t$. In summary, the GRU( ) function may be trained to combine appearance features of the current frame with the memorized video representation to refine motion predictions, or even fully restore them from the previous observations in case a moving object becomes stationary.

In such an example, the updated state 310 is determined by a GRU function based on a previous state $M^{t-1}$ and the feature map $F^t$. For an initial frame, the previous state $M^{t-1}$ may be initialized to a particular value, such as zero. The updated state 310 $M^t$ may be an example of an output feature map. In the example of FIG. 3, the explicit encoding of the objects in the previous frame $H^{t-1}$ (e.g., the heat map of prior tracked objects) is not used because the explicit encoding is captured in the ConvGRU state $M^t$. Additionally, in the example of FIG. 3, the updated state 310 $M^t$ may be processed by distinct sub-networks 330a $f_p$, 330b $f_s$, and 330c $f_d$ to produce predictions for the current frame $I^t$. The predictions are based on the updated state 310 $M^t$, which is based on the features of the current frame $I^t$ and the previous frames ($I^{t-1}$ to $I^1$). Each sub-network 330a, 330b, 330c may be a convolutional neural network trained to perform a specific task, such as determine object centers based on features of the updated state 310 $M^t$, determine bounding box dimensions based on features of the updated state 310 $M^t$, and determine displacement vectors of the updated state 310 $M^t$. That is, as shown in FIG. 3, the predictions may include an object location heatmap 312 $P_t$, bounding box dimensions 314 $S_t$, and displacement vectors 316 $D_t$. The operations described with reference to FIG. 3 may be fully differentiable. Therefore, the object tracking model 300 may be trained using a frame-level loss function in an end-to-end fashion with back propagation.

In some implementations, for each location in a frame, the object location heatmap 312 provides a score indicating whether an object center is present in the location at the current frame. In the example of FIG. 3, the frame may be divided into a grid of locations. A value of locations 320 with object centers may be different from a value of locations 322 that do not include object centers. In such examples, the object center refers to a center of an object, which may be determined by the first sub-network 330a trained to determine a center of an object (e.g., a heatmap). The bounding box dimensions 314 provide a size of a bounding box surrounding an object if the object is predicted to be in a location. For each object in a location, a displacement vector 316 provides a regression to a location of the object in a previous frame.

In some implementations, the object location heatmap 312 $P_t$ (e.g., location of object centers for each visible object in the current frame), bounding box dimensions 314 $S_t$, and displacement vectors 316 $D_t$ may be stored in memory, such as a memory module associated with the object tracking system and/or a memory module of an agent implementing the object tracking system. The agent may be an autonomous or semi-autonomous agent, such as an autonomous vehicle or a semi-autonomous vehicle. Additionally, object location heatmaps $P_t$ (e.g., locations of object centers for each visible object in the current frame), bounding box dimensions $S_t$, and displacement vectors $D_t$ may be stored in memory for each prior state (e.g., $M^{t-1}$ to $M^1$) corresponding to each respective previous frame ($I^{t-1}$ to $I^1$).

As described, conventional center-tracking models establish correspondences between objects in a pair of frames $\{I^{t-1}, I^t\}$ based on raw pixel values. Aspects of the present disclosure improve object tracking by establishing correspondences between objects over a sequence of frames based on feature representations. That is, the predictions for a current frame t, such as object location heatmaps 312, bounding box dimensions 314, and displacement vectors 316, may be based on a sequence of previous frames (e.g., frames ($I^{t-1}$ to $I^1$)) in contrast to only a single previous frame ($I^{t-1}$). Therefore, the object tracking model 300 may predict the presence of a occluded object at a location based on stored information regarding one or more of the object's previous locations, velocity, or trajectory. That is, object information, such as the object's location, velocity, and/or trajectory, may be aggregated over the previous frames to predict an object's location at a current frame regardless of whether the object is visible in the current frame.

In some implementations, a location of an object occluded in the current frame may be predicted based on a comparison of object centers $P_t$ decoded from the representation of the current state $M^t$ to object centers saved for each prior representation corresponding to each different respective prior frame ($I^{t-1}$ to $I^1$). In such implementations, the location of each object center $P_t$ for each visible object in the current frame may be compared with the stored location of each object center for each respective prior representation. The location of an object center $P_t$ may be matched to the closest object center $P_{t-1}$ to recover a track (e.g., path) for a corresponding object. Additionally, an object center of a prior representation that is not visible in the current frame may be identified based on the comparison of the location of each object center $P_t$ for each visible object in the current frame with the stored object center locations.

The object tracking model may then determine that an object corresponding to the identified object center is occluded in the current frame. Furthermore, the object tracking model (e.g., object tracking system) may predict the location of the object occluded in the current frame based on a stored location of the identified object center and a velocity predicted based on a stored displacement vector of the object corresponding to the identified object center. As described, the displacement vector identifies a displacement of the object from current frame to a prior frame. Thus, the object tracking system may predict an object's velocity based on a time between frames and a length of the displacement. That is, the model identifies a location of the occluded object by using an object's previously observed velocity, the object's last observed location, and a speed of the ego vehicle. In some examples, if a person walks behind a parked car the model can predict the person's location by propagating it with the last observed velocity of the person and accounting for the change of the relative position of the occluded with respect to the ego-car. In some other examples, after training, the model may predict the location based on training. * An accuracy of the predicted velocity may increase as a number of frames in which the object is visible increases.

In some implementations, a supervised learning method may be used to train the object-tracking model. Training and evaluation on sequences that are longer than two frames may further improve the object-tracking model due to the increased robustness of a video representation M, aggregated over multiple frames.

Conventional object tracking datasets do not provide labels for fully occluded objects, due to the complexity of collecting such annotations. That is, it is very difficult, if not practically impossible, to accurately labels invisible objects (e.g., occluded objects) in existing videos. In some implementations, a new dataset may be generated to train the object tracking model of the current disclosure. The new dataset may be collected in a controlled environment, where objects of interest may be equipped with tracking devices to registered their positions. Still, tracking behind occlusions may be prone to overfitting. Thus, it may be desirable to train an object tracking model on a large dataset, such as a dataset with at least hundreds of videos. Generating a large dataset in the controlled environment with objects of interest equipped with tracking devices may be cost-prohibitive. In one configuration, the new dataset is generated with synthetic data. The synthetic data (e.g., synthetic videos) may provide annotations for all the objects, irrespective of their visibility, at no additional cost.

Despite the progress in computer graphics realism, a model trained on synthetic videos may fail to achieve a desired level of accuracy for tracking and detecting objects. In one configuration, the object tracking model is jointly trained on synthetic data and real data. The real data may be provided for visible objects, and the synthetic data may be provided for occluded objects. Samples of real data used for training may be less than samples of synthetic data used for training. For example, during training, the object tracking model may be trained on the real data of length R and synthetic data of length N, where N is greater than R. Join training on synthetic and real data may allow the object tracking model to learn complex behavior, such as tracking behind occlusions, from synthetic data, while minimizing a domain gap due to the inclusion of real data.

In one configuration, to generate the training labels for a video sequence, the supervised learning method may receive a sequence of object annotations $\{O^1, O^2, \ldots, O^n\}$, with $O^t = \{o_1^t, o_2^t, \ldots, o_m^t\}$, as an input. Each object $o_i^t$ may be described by its center $p \in \mathbb{R}^2$, bounding box size $s \in \mathbb{R}^2$, identity id $\in I$ and visibility level vis $\in [0,1]$, such that the object $o_i^t = (p, s, id, vis)$. In some implementations, the identity id may be used together with a center p to supervise displacement vectors d.

The visibility levels vis may constrain the object-tracking model to detect and track visible objects. That is, without the visibility level vis, the object-tracking model may be forced to detect and track objects before they become visible and/or produce tracks for objects that are fully occluded for a whole duration of a video. In some implementations, the object annotations $\{O^1, O^2, \ldots, O^n\}$ may be pre-processed to supervise occluded an occluded object after the object has been visible for at least two frames. In some such implementations, a visual threshold $T_{vis}$ and an occlusion threshold $T_{occl}$ may be specified to enforce visibility constraints. In such implementations, beginning with a first frame in a sequence $O^1$, for every object $o_i^1$ in the frame, the object $o_i^1$ is treated as a negative if a visibility of the object $vis_i^1$ is less than the visibility threshold $T_{vis}$ (e.g., $vis_i^1 < T_{vis}$). Additionally, the object may be ignored if the visibility of the object $vis_i^1$ is greater than the visibility threshold $T_{vis}$ and less than the occlusion threshold $T_{occl}$ (e.g., $T_{vis} < vis_i^1 < T_{occl}$). Furthermore, the object $o_i^1$ may be marked as visible and used to produce a label if the visibility of the object $vis_i^1$ is greater than the occlusion threshold $T_{occl}$ (e.g., $vis_i^1 > T_{occl}$). The same procedure may be repeated for every frame in a sequence. Beginning with a third frame of the sequence of frames, objects that were previously marked as visible for two consecutive frames are treated as positives regardless of their visibility status in the current frame. The procedure for treating an object as a negative, a positive, or ignoring the object $o_i^t$ based on the visibility of the object $vis_i^t$ in comparison to the visual threshold $T_{vis}$ and the occlusion threshold $T_{occl}$ may provide a soft transition between visible and invisible objects, instead of forcing the model to make a hard choice. That is, the model does not need to make a hard choice whether to treat a partially occluded object as visible or as invisible. Instead the model may ignore such borderline cases during training. In some example, the visibility threshold $T_{vis}$ may be 0.05 and the occlusion threshold $T_{occl}$ may be 0.15, corresponding to 5% and 15% of the object being visible, respectively. $aT_{vis}$ and $T_{occl}$ may define which level of occlusion to treat as fully invisible, which as ignored, and which as visible The training procedure described above, however, assumes an availability of a video dataset with objects labeled regardless of whether they are visible. Such a dataset with such labels may be difficult to obtain due to costs and the complexity of obtaining precise bounding box labels for invisible objects. Therefore, in some implementations, synthetic datasets may be used to train the object tracking model.

The synthetic dataset may include a set of video clips (e.g., sequences of frames), where each video clip in the set of video clips has a same length, such as ten seconds. Alternatively, the length of the video clips may vary. Each video clip may represent a driving scenario, such as a crowded street with one or more occluded objects, such as a person and/or a vehicle. Due to the synthetic nature of each video clip, one or more objects in each video clip may be annotated with a bounding box, irrespective of the object's visibility. Additionally, or alternatively, accurate visibility estimates may be provided for one or more objects in each video clip.

Each video clip may provide one or more sequences, with each sequence captured by a sensor integrated with an ego-vehicle. As an example, the sensor may be a camera, a RADAR sensor, or a LiDAR sensor. In some implementations, the supervised training method uses sequences corresponding to front and side sensors to increase data diversity and complexity, and also minimize a domain gap with real datasets. During training, frame sequences of length N may be samples from each video clip. The annotations of the sampled sequences may be pre-processed, as described above. The object-tracking model may learn to track behind occlusions based on the training. For additional data augmentation, the training method may use consecutive frames or randomly sampled frames. As an example, the frames may be randomly sampled based on a random temporal stride Mf and/or reversed at random.

Training on synthetic datasets may create a domain discrepancy with real datasets. In some conventional systems, the domain discrepancy is addressed by fine-tuning the resulting model on a small real dataset. Still, in the current examples, the real datasets do not have labels for occluded objects. Therefore, such fine-tuning would result in unlearning the ability to track behind occlusions. Thus, in some implementations, the object-tracking model may be trained jointly on synthetic data and real data, where, at each iteration, a batch is sampled from one of the datasets at random. Additionally, to maintain consistency for occluded object supervision, a batch of real data may be less than or equal to two frames. As a result, the supervised training method may sample synthetic video clips of length N and real video clips of length two (e.g., a pair of real frames). In such implementations, the synthetic data may be used to learn a desired behavior and real data (e.g., pairs of real frames) may be used to reduce a domain gap. Additionally, or alternatively, a pair of real frames may be simulated by randomly shifting an image from an image-based, object detection dataset.

In some examples, an object-tracking model may ignore occluded objects, since full occlusions may constitute a small fraction of the dataset. In some such examples, to avoid ignoring objects, a weight of a localization loss for fully occluded instances may be increased. In addition, a box size loss for fully occluded instances may be ignored, because predicting a size of an invisible object may be ambiguous, and may not be needed during tracking.

Figure 4:
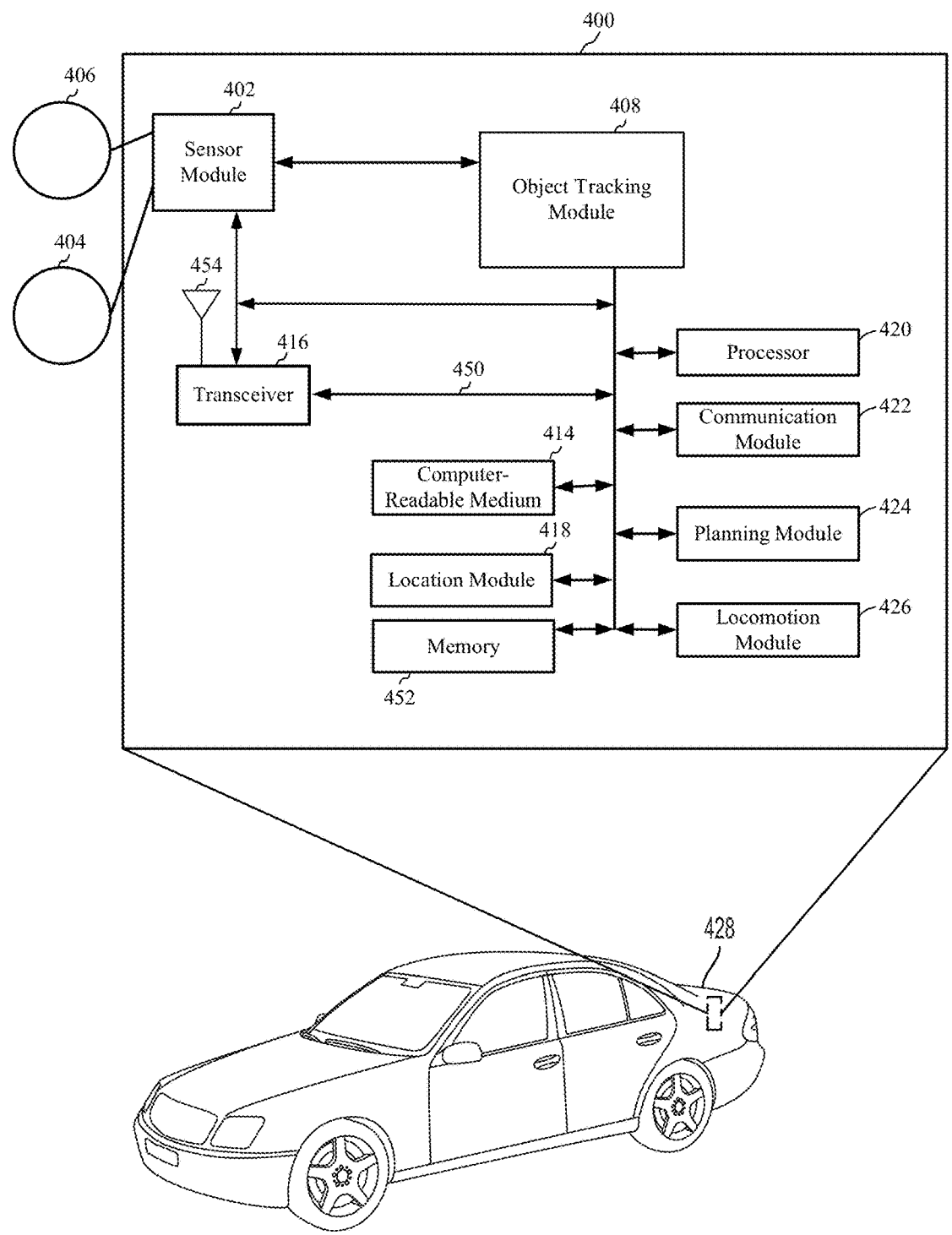
FIG. 4 is a block diagram illustrating an example of a hardware implementation for an object tracking system, in accordance with aspects of the present disclosure.

FIG. 4 is a diagram illustrating an example of a hardware implementation for an object tracking system 400, according to aspects of the present disclosure. The object tracking system 400 may be a component of a vehicle, a robotic device, or another device. For example, as shown in FIG. 4, the object tracking system 400 is a component of a vehicle 428. Aspects of the present disclosure are not limited to the object tracking system 400 being a component of the vehicle 428, as other types of agents, such as a bus, boat, drone, or robot, are also contemplated for using the object tracking system 400.

The vehicle 428 may operate in one or more of an autonomous operating mode, a semi-autonomous operating mode, and a manual operating mode. Furthermore, the vehicle 428 may be an electric vehicle, a hybrid vehicle, a fuel vehicle, or another type of vehicle. The autonomous operating mode may autonomously control the vehicle without human interaction or intervention. The semi-autonomous mode may control the vehicle 428 with human interaction. Additionally, or alternatively, in the semi-autonomous mode, a human may control the vehicle 428 and one or more components, such as one or more of the object tracking module 408, processor 420, a communication module 422, a location module 418, a sensor module 402, a locomotion module 426, a navigation module 424, memory 452, and a computer-readable medium 414 may override the human control. For example, the human control may be overridden to prevent a collision.

The object tracking system 400 may be implemented with a bus architecture, represented generally by a bus 440. The bus 440 may include any number of interconnecting buses and bridges depending on the specific application of the object tracking system 400 and the overall design constraints. The bus 440 links together various circuits including one or more processors and/or hardware modules, represented by a processor 420, a communication module 422, a memory 452, a location module 418, a sensor module 402, a locomotion module 426, a navigation module 424, memory 452, and a computer-readable medium 414. The bus 440 may also link various other circuits such as timing sources, peripherals, voltage regulators, and power management circuits, which are well known in the art, and therefore, will not be described any further. The memory 452 may include volatile and/or non-volatile memory. For example, the memory 452 may be read only memory (ROM), programmable ROM (PROM), electronic programmable ROM (EPROM), electronic erasable PROM (EEPROM), flash memory, random access memory (RAM), or other types of volatile or non-volatile memory. Additionally, the RAM may be, for example, synchronous RAM (SRAM), dynamic RAM (DRAM), synchronous DRAM (SDRAM), double data rate SDRAM (DDR SDRAM), enhanced SDRAM (ESDRAM), sync link DRAM, (SLDRAM), direct RAM bus RAM (DRRAM), or other types of RAM.

The object tracking system 400 includes a transceiver 416 coupled to the processor 420, the sensor module 402, a occluded object tracking module 408, the communication module 422, the location module 418, the locomotion module 426, the navigation module 424, and the computer-readable medium 414. The transceiver 416 is coupled to an antenna 444.

The object tracking system 400 includes the processor 420 coupled to the computer-readable medium 414. The processor 420 performs processing, including the execution of software stored on the computer-readable medium 414 providing functionality according to the disclosure. The software, when executed by the processor 420, causes the object tracking system 400 to perform the various functions described for a particular device, such as the vehicle 428, or any of the modules 402, 408, 414, 416, 418, 420, 422, 424, 426. The computer-readable medium 414 may also be used for storing data that is manipulated by the processor 420 when executing the software.

The sensor module 402 may be used to obtain measurements via different sensors, such as a first sensor 406 and a second sensor 404. The first sensor 406 may be a vision sensor, such as a stereoscopic camera or a red-green-blue (RGB) camera, for capturing 2D images. The second sensor 404 may be a ranging sensor, such as a light detection and ranging (LIDAR) sensor or a radio detection and ranging (RADAR) sensor. Of course, aspects of the present disclosure are not limited to the aforementioned sensors as other types of sensors, such as, for example, thermal, sonar, and/or lasers are also contemplated for either of the sensors 404, 406.

The measurements of the first sensor 406 and the second sensor 404 may be processed by one or more of the processor 420, the sensor module 402, the occluded object tracking module 408, the communication module 422, the location module 418, the locomotion module 426, the navigation module 424, in conjunction with the computer-readable medium 414 to implement the functionality described herein. In one configuration, the data captured by the first sensor 406 and the second sensor 404 may be transmitted to an external device via the transceiver 416. The first sensor 406 and the second sensor 404 may be coupled to the vehicle 428 or may be in communication with the vehicle 428.

The location module 418 may be used to determine a location of the vehicle 428. For example, the location module 418 may use a global positioning system (GPS) to determine the location of the vehicle 428. The communication module 422 may be used to facilitate communications via the transceiver 416. For example, the communication module 422 may be configured to provide communication capabilities via different wireless protocols, such as WiFi, long term evolution (LTE), 4G, etc. The communication module 422 may also be used to communicate with other components of the vehicle 428 that are not modules of the object tracking system 400.

The locomotion module 426 may be used to facilitate locomotion of the vehicle 428. As an example, the locomotion module 426 may control a movement of the wheels. As another example, the locomotion module 426 may be in communication with one or more power sources of the vehicle 428, such as a motor and/or batteries. Of course, aspects of the present disclosure are not limited to providing locomotion via wheels and are contemplated for other types of components for providing locomotion, such as propellers, treads, fins, and/or jet engines.

The object tracking system 400 also includes the navigation module 424 for planning a route or controlling the locomotion of the vehicle 428, via the locomotion module 426. The navigation module 424 may override user input when the user input is expected (e.g., predicted) to cause a collision. The modules may be software modules running in the processor 420, resident/stored in the computer-readable medium 414, one or more hardware modules coupled to the processor 420, or some combination thereof.

Figure 5:
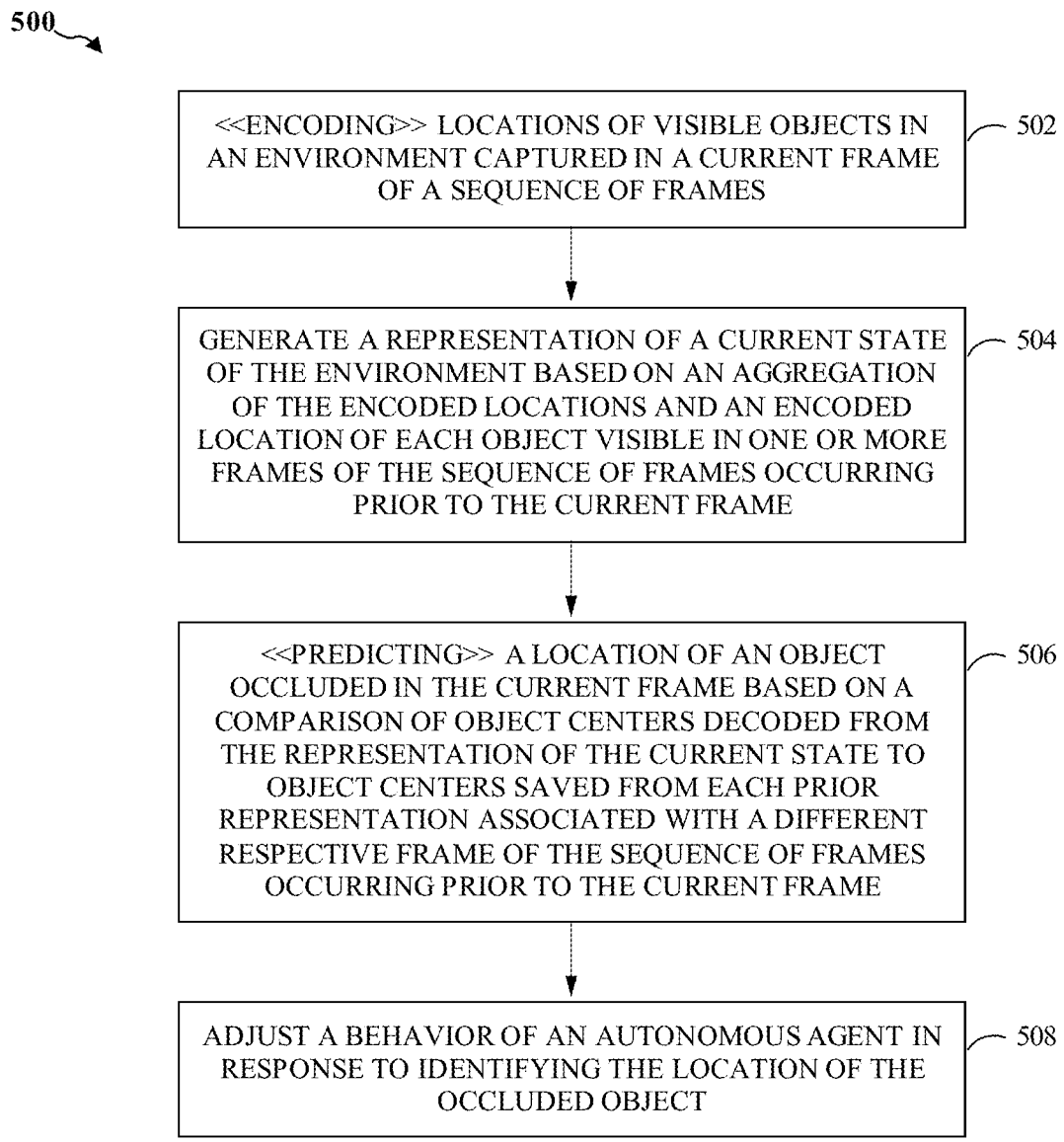
FIG. 5 illustrates a flow diagram for a method of tracking an occluded object, in accordance with aspects of the present disclosure.

The occluded object tracking module 408 may perform one or more elements of the process 500 described with respect to FIG. 5. In some implementations, working in conjunction with one or more of the processor 420, sensor module 402, and computer-readable medium 414, the object tracking module 408 encodes locations of visible objects in an environment captured in a current frame of a sequence of frames. Additionally, working in conjunction with one or more of the processor 420, sensor module 402, and computer-readable medium 414, the object tracking module 408 generates a representation of a current state of the environment based on an aggregation of the encoded locations and an encoded location of each object visible in one or more frames of the sequence of frames occurring prior to the current frame. The representation may be stored in memory, such as the memory 452. The sequence of frames may be captured via one or more sensors of the autonomous agent, such as the sensors 404, 406. Additionally, the sequence of frames may include a number of consecutive frames. In some implementations, the object tracking module 408 may be trained based on synthetic data and/or real data.

In some implementations, working in conjunction with one or more of the processor 420, sensor module 402, and computer-readable medium 414, the object tracking module 408 decodes, from the generated representation of the current frame, a location in the environment of each object center for each visible object in the current frame, a bounding box size for each visible object in the current frame, and a displacement vector for each visible object in the current frame. For example, the object tracking module 408 may use one or more neural networks, such as sub-networks 330a, 330b, 330c as described with respect to FIG. 3, to determine an object location heatmap $P_t$, bounding box dimensions $S_t$, and displacement vectors $D_t$. The one or more neural networks may be components of the object tracking module 408. In some such implementations, the object tracking module 408 may also divide the current frame into a number of locations and assign a value to each location of the number of locations based on whether the location comprises an object center, a value of a location comprising the object center being different than a value of a location without the object center. Additionally, the object tracking module 408 may store, in the memory 452, for each prior representation a location in the environment of each object center, a displacement vector, and a bounding box size corresponding to each different respective visible object in the frame associated with the respective prior representation.

In some implementations, working in conjunction with one or more of the processor 420, sensor module 402, and computer-readable medium 414, the object tracking module 408 predicts a location of an object occluded in the current frame based on a comparison of object centers decoded from the representation of the current state to object centers saved from each prior representation associated with a different respective frame of the sequence of frames occurring prior to the current frame. In some implementations, the process 500 may predict the location by comparing the location of each object center for each visible object in the current frame with the stored location of each object center for each respective prior representation. In such implementations, working in conjunction with one or more of the processor 420, sensor module 402, and computer-readable medium 414, the object tracking module 408 may also identify an object center of a prior representation that is not visible in the current frame based on comparing the location of each object center for each visible object in the current frame with the stored location. The object tracking module 408 may further determine an object corresponding to the identified object center is occluded in the current frame. Also, in such implementations, the object tracking module 408 may predict the location of the object occluded in the current frame based on a stored location of the identified object center and a velocity predicted based on a stored displacement vector of the object corresponding to the identified object center.

In some implementations, working in conjunction with one or more of the processor 420, sensor module 402, locomotion module 426, planning module 424, communication module 422, and computer-readable medium 414, the object tracking module 408 adjusts a behavior of the vehicle 428 in response to identifying the location of the occluded object.

FIG. 5 illustrates a flow diagram 500 for a process for tracking an object, in accordance with aspects of the present disclosure. In some implementations, the process 500 may be performed by an object tracking system operating as or within an agent, such as the vehicle 100 or the vehicle 428 as described above with respect to FIGS. 1 and 4, respectively. In some such implementations, the process 500 may be performed by the object tracking system 400 or the occluded object tracking module 408 described with respect to FIG. 4.

In some implementations, the process 500 begins in block 502 with encoding locations of visible objects in an environment captured in a current frame of a sequence of frames. At block 504, the process 500 generates a representation of a current state of the environment based on an aggregation of the encoded locations and an encoded location of each object visible in one or more frames of the sequence of frames occurring prior to the current frame. The sequence of frames may be captured via one or more sensors of the autonomous agent, such as the sensors 106,108 or 404,406 described with respect to FIGS. 1 and 4, respectively. Additionally, the sequence of frames may include a number of consecutive frames. In some implementations, the process 500 may be trained based on synthetic data and/or real data.

In some implementations, the process 500 decodes, from the generated representation of the current frame, a location in the environment of each object center for each visible object in the current frame, a bounding box size for each visible object in the current frame, and a displacement vector for each visible object in the current frame. For example, the process 500 may use one or more neural networks, such as sub-networks 330a, 330b, 330c as described with respect to FIG. 3, to determine an object location heatmap $P_t$, bounding box dimensions $S_t$, and displacement vectors $D_t$. In some such implementations, the process 500 may also divide the current frame into a number of locations and assign a value to each location of the number of locations based on whether the location comprises an object center, a value of a location comprising the object center being different than a value of a location without the object center. Additionally, the process 500 may store for each prior representation a location in the environment of each object center, a displacement vector, and a bounding box size corresponding to each different respective visible object in the frame associated with the respective prior representation.

At block 506, the process 500 predicts a location of an object occluded in the current frame based on a comparison of object centers decoded from the representation of the current state to object centers saved from each prior representation associated with a different respective frame of the sequence of frames occurring prior to the current frame. In some implementations, the process 500 may predict the location by comparing the location of each object center for each visible object in the current frame with the stored location of each object center for each respective prior representation. In such implementations, the process 500 may also identify an object center of a prior representation that is not visible in the current frame based on comparing the location of each object center for each visible object in the current frame with the stored location. The process 500 may further determine an object corresponding to the identified object center is occluded in the current frame. Also, in such implementations, the process 500 may predict the location of the object occluded in the current frame based on a stored location of the identified object center and a velocity predicted based on a stored displacement vector of the object corresponding to the identified object center.

At block 508, the process 500 adjusts a behavior of an autonomous agent in response to identifying the location of the occluded object. Aspects of the present disclosure are not limited to implementing the object tracking system in an autonomous agent, other types of agents, such as semi-autonomous or manually operated agents are contemplated.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for tracking occluded objects performed by an object tracking system, comprising:
   encoding locations of visible objects in an environment captured in a current frame of a sequence of frames;

generating a representation of a current state of the environment based on an aggregation of the encoded locations and an encoded location of each object visible in one or more frames of the sequence of frames occurring prior to the current frame;

predicting a location of an object occluded in the current frame based on a comparison of object centers decoded from the representation of the current state to object centers saved from each prior representation associated with a different respective frame of the sequence of frames occurring prior to the current frame; and adjusting a behavior of an autonomous agent in response to predicting the location of the object occluded in the current frame.

2. The method of claim 1, further comprising decoding, from the generated representation of the current state, a location in the environment of each object center for each visible object in the current frame, a bounding box size for each visible object in the current frame, and a displacement vector for each visible object in the current frame.

3. The method of claim 2, further comprising:
dividing the current frame into a plurality of locations; and
assigning a value to each location of the plurality of locations based on whether the location comprises an object center, a value of a location comprising the object center being different than a value of a location without the object center.

4. The method of claim 2, further comprising storing, for each prior representation, a location in the environment of each object center, a displacement vector, and a bounding box size corresponding to each different respective visible object in a frame associated with a respective prior representation.

5. The method of claim 4, wherein predicting the location of the object occluded in the current frame comprises:
comparing the location in the environment of each object center for each visible object in the current frame with the location in the environment of each object center for each prior representation;
identifying an object center of a prior representation that is not visible in the current frame based on comparing the location in the environment of each object center for each visible object in the current frame with the location in the environment of each object center for each prior representation;
determining an object corresponding to the identified object center is occluded in the current frame; and
predicting the location of the object occluded in the current frame based on a location in the environment of the identified object center and a velocity predicted based on a displacement vector of the object corresponding to the identified object center.

6. The method of claim 1, further comprising capturing the sequence of frames via one or more sensors of the autonomous agent, wherein the sequence of frames comprises a plurality of consecutive frames.

7. The method of claim 1, further comprising training the object tracking system with a combination of synthetic data and real data.

8. An apparatus for tracking an object at an autonomous agent via an object tracking system, comprising:
a processor;
a memory coupled with the processor; and
instructions stored in the memory and operable, when executed by the processor, to cause the apparatus to:
encode locations of visible objects in an environment captured in a current frame of a sequence of frames;
generate a representation of a current state of the environment based on an aggregation of the encoded locations and an encoded location of each object visible in one or more frames of the sequence of frames occurring prior to the current frame;
predict a location of an object occluded in the current frame based on a comparison of object centers decoded from the representation of the current state to object centers saved from each prior representation associated with a different respective frame of the sequence of frames occurring prior to the current frame; and
adjust a behavior of the autonomous agent in response to predicting the location of the object occluded in the current frame.

9. The apparatus of claim 8, wherein execution of the instructions further causes the apparatus to decode, from the generated representation of the current state, a location in the environment of each object center for each visible object in the current frame, a bounding box size for each visible object in the current frame, and a displacement vector for each visible object in the current frame.

10. The apparatus of claim 9, wherein execution of the instructions further causes the apparatus to:
divide the current frame into a plurality of locations; and
assign a value to each location of the plurality of locations based on whether the location comprises an object center, a value of a location comprising the object center being different than a value of a location without the object center.

11. The apparatus of claim 9, wherein execution of the instructions further causes the apparatus to store, for each prior representation, a location in the environment of each object center, a displacement vector, and a bounding box size corresponding to each different respective visible object in a frame associated with a respective prior representation.

12. The apparatus of claim 11, wherein execution of the instructions to predict the location of the object occluded in the current frame further causes the apparatus to:
compare the location in the environment of each object center for each visible object in the current frame with the location in the environment of each object center for each prior representation;
identify an object center of a prior representation that is not visible in the current frame based on comparing the location in the environment of each object center for each visible object in the current frame with the location in the environment of each object center for each prior representation;
determine an object corresponding to the identified object center is occluded in the current frame; and
predict the location of the object occluded in the current frame based on a location in the environment of the identified object center and a velocity predicted based on a displacement vector of the object corresponding to the identified object center.

13. The apparatus of claim 8, wherein execution of the instructions further causes the apparatus to capture the sequence of frames via one or more sensors of the autonomous agent, wherein the sequence of frames comprises a plurality of consecutive frames.

14. The apparatus of claim 8, wherein execution of the instructions further causes the apparatus to train the object tracking system with a combination of synthetic data and real data.

15. A non-transitory computer-readable medium having program code recorded thereon for tracking an object, the program code executed by a processor and comprising:
- program code to encode locations of visible objects in an environment captured in a current frame of a sequence of frames;
- program code to generate a representation of a current state of the environment based on an aggregation of the encoded locations and an encoded location of each object visible in one or more frames of the sequence of frames occurring prior to the current frame;
- program code to predict a location of an object occluded in the current frame based on a comparison of object centers decoded from the representation of the current state to object centers saved from each prior representation associated with a different respective frame of the sequence of frames occurring prior to the current frame; and
- program code to adjust a behavior of an autonomous agent in response to predicting the location of the object occluded in the current frame.

16. The non-transitory computer-readable medium of claim 15, wherein the program code further comprises program code to decode, from the generated representation of the current state, a location in the environment of each object center for each visible object in the current frame, a bounding box size for each visible object in the current frame, and a displacement vector for each visible object in the current frame.

17. The non-transitory computer-readable medium of claim 16, wherein the program code further comprises:
- program code to divide the current frame into a plurality of locations; and
- program code to assign a value to each location of the plurality of locations based on whether the location comprises an object center, a value of a location comprising the object center being different than a value of a location without the object center.

18. The non-transitory computer-readable medium of claim 16, wherein the program code further comprises program code to store for each prior representation a location in the environment of each object center, a displacement vector, and a bounding box size corresponding to each different respective visible object in a frame associated with a respective prior representation.

19. The non-transitory computer-readable medium of claim 18, wherein the program code to predict the location of the object occluded in the current frame further comprises:
- program code to compare the location in the environment of each object center for each visible object in the current frame with the location in the environment of each object center for each prior representation;
- program code to identify an object center of a prior representation that is not visible in the current frame based on comparing the location in the environment of each object center for each visible object in the current frame with the location in the environment of each object center for each prior representation;
- program code to determine an object corresponding to the identified object center is occluded in the current frame; and
- program code to predict the location of the object occluded in the current frame based on a location in the environment of the identified object center and a velocity predicted based on a displacement vector of the object corresponding to the identified object center.

20. The non-transitory computer-readable medium of claim 15, wherein the program code further comprises program code to capture the sequence of frames via one or more sensors of the autonomous agent, wherein the sequence of frames comprises a plurality of consecutive frames.

\* \* \* \* \*